United States Patent
Yamamoto et al.

(10) Patent No.: US 8,239,084 B2
(45) Date of Patent: Aug. 7, 2012

(54) MOVING DEVICE

(75) Inventors: Kenjiro Yamamoto, Matsudo (JP); Saku Egawa, Toride (JP); Takashi Tsubouchi, Tsukuba (JP); Jae Hoon Lee, Tsukuba (JP)

(73) Assignee: Hitachi, Ltd., Tokyo (JP)

( * ) Notice: Subject to any disclaimer, the term of this patent is extended or adjusted under 35 U.S.C. 154(b) by 720 days.

(21) Appl. No.: 12/377,692

(22) PCT Filed: Sep. 10, 2007

(86) PCT No.: PCT/JP2007/067590
§ 371 (c)(1),
(2), (4) Date: Feb. 17, 2009

(87) PCT Pub. No.: WO2008/032673
PCT Pub. Date: Mar. 20, 2008

(65) Prior Publication Data
US 2010/0235033 A1 Sep. 16, 2010

(30) Foreign Application Priority Data
Sep. 11, 2006 (JP) .................................. 2006-245554

(51) Int. Cl.
*G01C 22/00* (2006.01)
*G05D 1/00* (2006.01)

(52) U.S. Cl. ................. 701/26; 701/1; 701/23; 701/24; 701/25; 701/27; 701/28; 701/400; 701/520; 701/534; 701/300; 701/301; 701/302

(58) Field of Classification Search .......................... None
See application file for complete search history.

(56) References Cited

U.S. PATENT DOCUMENTS

| | | | | |
|---|---|---|---|---|
| 4,628,453 | A * | 12/1986 | Kamejima et al. | 701/28 |
| 4,638,445 | A * | 1/1987 | Mattaboni | 701/23 |
| 4,652,803 | A * | 3/1987 | Kamejima et al. | 318/587 |
| 4,751,658 | A * | 6/1988 | Kadonoff et al. | 701/301 |
| 4,954,962 | A * | 9/1990 | Evans et al. | 701/28 |
| 5,036,474 | A * | 7/1991 | Bhanu et al. | 348/117 |
| 5,111,401 | A * | 5/1992 | Everett et al. | 701/24 |
| 5,170,352 | A * | 12/1992 | McTamaney et al. | 701/26 |
| 5,202,661 | A * | 4/1993 | Everett et al. | 340/522 |
| 5,283,739 | A * | 2/1994 | Summerville et al. | 701/23 |
| 5,307,271 | A * | 4/1994 | Everett et al. | 701/24 |
| 5,525,882 | A * | 6/1996 | Asaka et al. | 318/568.16 |
| 5,545,960 | A * | 8/1996 | Ishikawa | 318/587 |
| 5,559,695 | A * | 9/1996 | Daily | 701/1 |
| 5,819,008 | A * | 10/1998 | Asama et al. | 700/255 |
| 6,442,476 | B1 * | 8/2002 | Poropat | 701/207 |
| 6,728,608 | B2 * | 4/2004 | Ollis et al. | 701/28 |
| 7,015,831 | B2 * | 3/2006 | Karlsson et al. | 340/995.1 |
| 7,113,867 | B1 * | 9/2006 | Stein | 701/301 |
| 7,135,992 | B2 * | 11/2006 | Karlsson et al. | 340/995.1 |

(Continued)

FOREIGN PATENT DOCUMENTS
JP  62.34784  2/1987
(Continued)

*Primary Examiner* — Khoi Tran
*Assistant Examiner* — Bhavesh V Amin
(74) *Attorney, Agent, or Firm* — Antonelli, Terry, Stout & Kraus, LLP.

(57) ABSTRACT

A moving device (70) determines an obstacle virtual existence region (72) of a simple graphic approximating a detected obstacle (71) to detect the obstacle (71) in a real time and determine a smooth avoidance path by calculation, thereby performing collision prediction.

13 Claims, 7 Drawing Sheets

U.S. PATENT DOCUMENTS

| | | | |
|---|---|---|---|
| 7,145,478 B2 * | 12/2006 | Goncalves et al. | 340/995.1 |
| 7,162,338 B2 * | 1/2007 | Goncalves et al. | 701/23 |
| 7,239,339 B2 * | 7/2007 | Nagai et al. | 348/116 |
| 7,272,467 B2 * | 9/2007 | Goncalves et al. | 700/245 |
| 7,333,631 B2 * | 2/2008 | Roh et al. | 382/104 |
| 7,437,498 B2 * | 10/2008 | Ronen | 711/103 |
| 7,689,321 B2 * | 3/2010 | Karlsson | 700/253 |
| 7,818,090 B2 * | 10/2010 | Okamoto | 700/253 |
| 2002/0120361 A1 * | 8/2002 | Kuroki et al. | 700/245 |
| 2006/0195226 A1 * | 8/2006 | Matsukawa et al. | 700/245 |
| 2011/0137462 A1 * | 6/2011 | Nakamura et al. | 700/253 |

FOREIGN PATENT DOCUMENTS

| | | |
|---|---|---|
| JP | 62-274313 | 11/1987 |
| JP | 63-200208 | 8/1988 |
| JP | 63-265312 | 11/1988 |
| JP | 04-358209 | 12/1992 |
| JP | 07-064633 | 3/1995 |
| JP | 07-064634 | 3/1995 |
| JP | 07-129898 | 5/1995 |
| JP | 10-143245 | 5/1998 |
| JP | 11-149315 | 6/1999 |
| JP | 11-194822 | 7/1999 |
| JP | 2000-020117 | 1/2000 |
| JP | 2003-187399 | 7/2003 |
| JP | 2003-241836 | 8/2003 |
| JP | 2003-266349 | 9/2003 |
| JP | 2003-280738 | 10/2003 |
| JP | 2004-76499 | 3/2004 |
| JP | 2004-306247 | 11/2004 |

* cited by examiner

MOVING DEVICE

TECHNICAL FIELD

The present invention relates to a moving device, and in particular, is suitable for a moving device which works under an environment where a stationary or moving obstacle exists. The present invention can be used for a moving device which can move at a speed equal to or faster than a human under an environment where a human or other fast moving device or a static or dynamic obstacle exist, and can be used for an automatic carrier device, automatic cleaning device, security robot, in addition to a rescue device, probe vehicle, or automatic driving vehicle which moves over outdoor irregular ground, a service robot in various environments such as a factory, hospital, office, road and irregular ground, or the like.

BACKGROUND ART

Recently, technology for automating such tasks as is performed by a human under a specific environment has been rapidly advanced according to the development of various electronics such as computation technology, sensing technology and communication technology. In this situation, autonomous moving devices, which are devices automatically moving without being steered by a human, are also actively developed into practical use at present. Autonomous moving devices, which have been put to practical use, include an automatic carrier device, automatic cleaning device and security robot, which basically travel in an environment with a leveled and improved land. Autonomous moving devices, such as a rescue device or probe vehicle which moves on outdoor irregular ground, an autonomous driving vehicle which travels along a road, and a robot which works in a complex environment such as a station and office where humans exist, are expected to be put to practical use. Under such a situation, there has been growing demand for an obstacle avoidance technique which enables a moving device to move while autonomously avoiding an obstacle even when the obstacle exists in a working environment.

There have been disclosed a digital graph search method (for example, see PATENT DOCUMENT 1), a step search method (for example, see PATENT DOCUMENT 2), a potential method (for example, see PATENT DOCUMENT 3) and the like, as conventional technology for avoiding an unknown stationary obstacle in a local working environment. The digital graph search method is a technique for searching directions to reach a destination by dividing a working environment into fine grids and moving through only grids with no obstacle. The step search method is a technique for taking a detour around an obstacle by controlling a moving device in each step and selecting a point in a region with no obstacle as a next step. The potential method is a technique for controlling a moving device by use of a resultant force of a repulsive force from an obstacle and an attractive force from a destination on the assumption that there is a high potential field in an obstacle existence region while there is a low potential field in the destination. Especially in PATENT DOCUMENT 3, it is disclosed that a moving obstacle is avoided by using a probability potential field in which the existence probability of a moving obstacle is reflected in a potential field.
PATENT DOCUMENT 1: JP-A-2003-266349
PATENT DOCUMENT 2: JP-A-07-64633
PATENT DOCUMENT 3: JP-A-2003-241836

DISCLOSURE OF THE INVENTION

Problems to be Solved by the Invention

As described above, autonomous moving devices are expected to work in various environments. Especially in the term of performing a task instead of a human, there is a demand for an autonomous moving device which can move at a speed equal to or faster than a human under an environment where a human or other fast moving device exists. To that end, the moving device itself needs to move at high speed while avoiding an obstacle which moves at high speed. In order to achieve this, it is necessary to detect an obstacle and calculate an avoidance path in real time, and at the same time, to generate a continuous smooth path on which the moving device can stably travel even at a high speed. For example, in a case where the moving device moves at a speed of about 1.3 m/s that is a normal speed at which a human walks, the moving device and a human move at the similar speed and approach each other at a speed of not slower than 2 m/s when passing each other. Therefore, in order to exist together with humans, it is necessary to allow instant adjustment of a travel path by generating an avoidance path within a short time of about 100 to several 100 ms or less.

However, the conventional technology such as the digital graph search method and step search method described above has such a problem that they target only a stationary obstacle and cannot respond to a moving obstacle. Also, the conventional technology such as the digital graph search method and potential method has such a problem that there is a limit to a real-time calculation. Furthermore, the conventional technology described above has such a problem that a smooth path on which the moving device can stably travel at a high speed cannot be generated.

It is an object of the present invention to provide a moving device which can move at a high speed even under an environment where a moving obstacle exists.

Means for Solving the Problems

In order to attain the above object, the present invention is achieved by following means.
(1) A moving device that moves under an environment where a stationary or moving obstacle exists, includes: external information acquiring means for acquiring external information; obstacle detecting means for detecting an external object that exists from time-series information in which the external information from the external information acquiring means and posture information of the moving device are accumulated, and extracting an obstacle that is an object possibly impeding the motion of the moving device from the time-series information; obstacle feature estimating means for estimating a feature of the obstacle, including a size, a shape or a shape change of the obstacle and a position and a motion pattern of the obstacle from the time-series information of the single or the plurality of obstacles detected by the obstacle detecting means; collision predicting means for performing collision prediction with the obstacle from the position and feature of the obstacle and the posture information and path information of the moving device; avoidance route planning means for calculating a through point that passes through right or left side or a surrounding area of the obstacle for avoiding the obstacle, and planning a single or a plurality of avoidance routes that pass through the through point in a case where collision with the obstacle is predicted; and avoidance path generating means for adjusting the through point so as not to interfere with the obstacle, and generating a smooth avoidance path on which the moving device can travel, whereby a smooth avoidance path is generated in real time by tracking the obstacle.

Accordingly, the moving device can move at high speed even under an environment where a single or a plurality of moving obstacles exist.

(2) By including at least one of the followings and assisting a driver or an operator, safety improvement and avoidance simulation in real time can be achieved in a vehicle such as an automobile:

means for presenting or instructing a state or operation information of the moving device by an image or a sound by using information of the generated smooth avoidance path;

steering means for changing a direction control state of the moving device by using the information of the generated smooth avoidance path; and travel control means for changing a travel state by using the information of the generated smooth avoidance path.

(3) The collision prediction with the obstacle by the collision predicting means, or the calculation of changes in a motion direction and a motion speed of the moving device or the calculation of the through point by the avoidance route planning means is calculated by using an obstacle-fixing relative space in which the position of the obstacle is fixed and the moving device moves with a relative motion vector with the obstacle. Accordingly, the calculation of the through point can be geometrically solved, and the calculation of the through point, the collision prediction, and the avoidance process can be achieved at high speed.

(4) The obstacle feature estimating means includes at least one of: means for approximating the shape of the obstacle to a simple graphic including a circle, or a polygon, or a single or a plurality of straight lines; means for approximating the motion pattern of the obstacle to uniform linear motion; and means for approximating a motion pattern of the moving device to uniform linear motion. Accordingly, the collision prediction with the obstacle and the calculation of the through point are dramatically facilitated.

(5) The collision predicting means prepares a region that has a risk to collide with the obstacle and a region that takes into account a safe distance between the obstacle and the moving device, and selectively uses the regions depending on urgency of avoidance. Accordingly, the safety of avoidance motion is improved.

(6) The avoidance route planning means smoothly connects a current path to the avoidance path by making a new avoidance plan from a position after passage of a predetermined period on the current path in view of a free running period of the moving device. Accordingly, it becomes easy to smoothly connect the current path to the avoidance path.

(7) When finally selecting an avoidance route from the plurality of avoidance routes, the avoidance route planning means sets an order of priority by evaluating at least one of a shortest route, a shortest arrival time, a smallest angular change, a smallest speed change, passing behind a moving obstacle, and a width of an avoidance route. Accordingly, an optimum route can be selected.

(8) The obstacle feature estimating means performs an obstacle avoidance process by regarding a portion that changes greatly as an independent moving obstacle in a case where the obstacle changes greatly in shape. Accordingly, the collision prediction and the avoidance process can be achieved at a high speed.

(9) The avoidance path generating means performs a search such that the smooth avoidance path becomes smoothest, while moving a through point, by repeatedly evaluating an avoidance path obtained by displacing a through point in surrounding eight directions and selecting the through point through which a curvature change is smooth and smallest. Accordingly, an optimum path can be generated.

(10) The moving device further includes an operation integrated management unit for changing a posture of the moving device to reduce interference with the obstacle during avoidance. Accordingly, a collision risk is reduced, and a movable range is widened.

(11) The avoidance route planning means connects a pass passing a last through point for avoiding the obstacle to a straight line in a motion target direction or a destination point of the moving device. Accordingly, a stable path can be generated even after the avoidance is completed.

(12) The obstacle detecting means composes the time-series information of a time when the external information is acquired, a position, a size and a shape of an object detected from the external information, a self position, a direction and a self posture of the moving device at the time, and association information of data of the detected object at a different time. Accordingly, the detection of the obstacle, and the process of the shape, shape change and motion pattern of the obstacle can be achieved.

Advantages of the Invention

According to the moving device of the present invention, high-speed motion is achieved even under an environment where a moving obstacle exists.

Other objects, features and advantages of the present invention will become apparent from the following description of embodiments of the present invention in conjunction with the accompanying drawings.

BEST MODE FOR CARRYING OUT THE INVENTION

A plurality of embodiments of the present invention will be described using the drawings.

First Embodiment

A moving device according to a first embodiment of the present invention will be described using FIGS. 1 to 8.

Figure 1A:
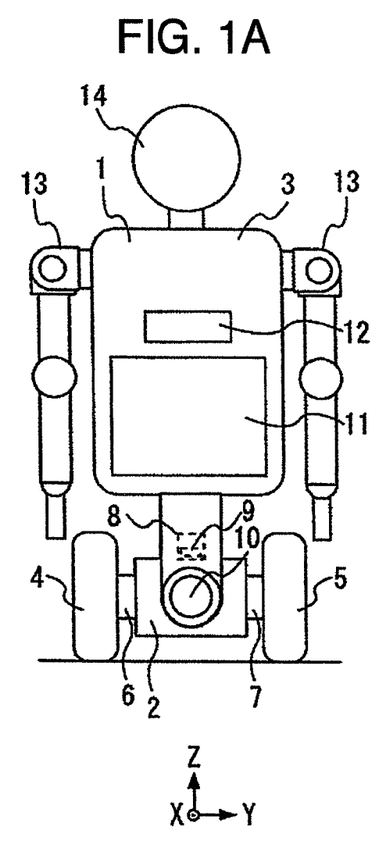
FIG. 1A is an elevation view for explaining a configuration of a moving device according to a first embodiment of the present invention.
Figure 1B:
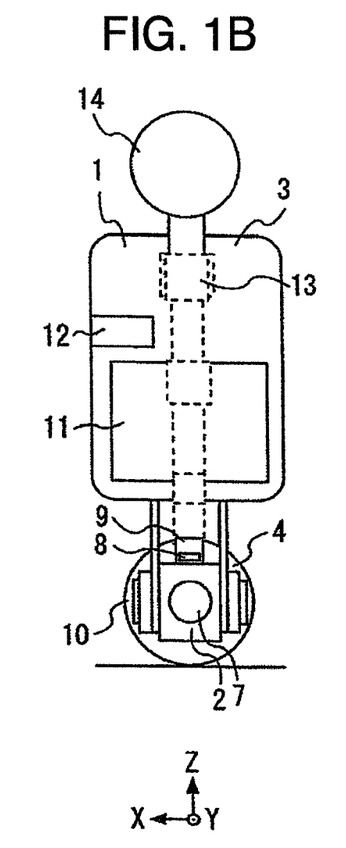
FIG. 1B is a side view of the moving device in FIG. 1.

First, the moving device of the present embodiment will be simply described using FIGS. 1A and 1B. FIGS. 1A and 1B are views for explaining a configuration of a moving device 1 which intends to work under an environment where a human exists. FIG. 1A is an elevation view of the moving device 1, and FIG. 1B is a side view of the moving device 1.

The moving device 1 is an inverted pendulum mobile robot, and is mainly divided into a moving mechanism 2 and an upper body 3. The moving mechanism 2 includes right and left wheels 4 and 5, and travel motors 6 and 7 for rotationally driving the wheels. In the upper portion of the moving mechanism 2, there are provided a tri-axial acceleration sensor 9 for detecting the acceleration of the moving mechanism 2 in the X-, Y- and Z-axis directions, and a posture/direction sensor 8 for detecting a posture on the basis of the vertical direction and a direction around the vertical direction are provided. Working devices such as working arms 13 and a head 14 having a human interface function are mounted on the upper body 3. Furthermore, in the upper body 3, a control device 11 for controlling the entire robot is incorporated, and also, an external sensor 12 for measuring the position and shape of an obstacle in a travel direction which exists in a travel region is provided.

The moving mechanism 2 and the upper body 3 having the above configuration are coupled to each other by a swing mechanism 10 having a rotational degree of freedom in the X-axis direction, and the posture of the upper body 3 relative to the moving mechanism 2 can be optionally set by position control of the swing mechanism 10.

The moving device 1 can move at a speed of not slower than 1.6 m/s that is considered as a brisk walking speed of a human. Therefore, an obstacle avoidance process needs to be carried out at very high speed. For example, in a case where an obstacle having the same speed is coming from the opposite direction, the moving device 1 and the obstacle approach each other at not slower than 3.2 m per second. Thus, in consideration of a free running period and a period of actual avoidance running, it is better to make an obstacle avoidance processing time shorter, preferably not longer than 100 ms, for example. While the moving device 1 can quickly change its direction since the moving device 1 moves using the two wheels, it is preferable to generate a smooth travel path in order to allow the moving device to stably move at a high speed.

Figure 2:
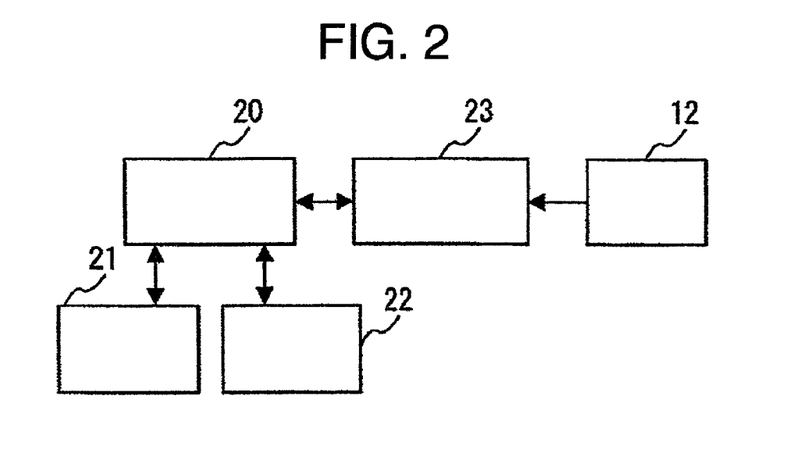
FIG. 2 is a view showing a configuration of a control device of the moving device according to the first embodiment.

Next, the relationship among an obstacle avoidance processor 23 and other control units 20 to 22 in the present embodiment will be simply described using FIG. 2. FIG. 2 is a view showing a configuration of the control device of the moving device 1 according to the present embodiment.

An obstacle avoidance function of the present embodiment is processed by the obstacle avoidance processor 23, and is managed by an operation integrated management unit 20.

The obstacle avoidance processor 23 successively receives environment data around the moving device from the external sensor 12, and at the same time, receives the data of the posture, position, path and the like of the moving device 1 from the operation integrated management unit 20. The obstacle avoidance processor 23 calculates the position, existence region, and motion speed of an object around the moving device on the basis of the data, and performs collision calculations with the object on the basis of the calculation results. In a case where there is a possibility of collision in the collision calculations, the obstacle avoidance processor 23 calculates an avoidance route and an avoidance path, and transmits the detection data of the collision possibility, avoidance path data or the like to the operation integrated management unit 20.

The operation integrated management unit 20 performs two-way communication with the respective control units 21 to 23, and performs watchdog management, time management, data integrated management, motion timing management in accordance with a state transition sequence, and the like. For example, when arm motion and travel motion are carried out in conjunction with each other, the operation integrated management unit 20 successively receives the information of a path on which the moving device actually moved, a state or the like from the arm control unit 21 and the travel control unit 22, transmits a command to the travel control unit 22 to move to a predetermined position when the arms 13 come to a predetermined position, and transmits an arm motion command to the arm control unit 21 when a predetermined traveling condition is satisfied.

Also, when the operation integrated management unit 20 receives a signal to suggest the possibility of collision from the obstacle avoidance processor 23, the operation integrated management unit 20 switches a path on which the moving device is currently traveling to an avoidance path transmitted from the obstacle avoidance processor 23 at a predetermined timing, and transmits the path data to the travel control unit 22. The operation integrated management unit 20 further performs information integration and management of an audio-visual processor, various external sensor processors, speech processor, environment map and self-position management unit, travel data generating unit or the like.

Although the above respective processors are separately shown for the sake of convenience, the present invention is not limited thereto, each process may be Physically executed by a single processor, or divided into a plurality of processes, or processed by a plurality of devices.

Next, a method of avoiding an obstacle of the moving device 1 will be described with reference to FIGS. 3 to 8.

Figure 3:
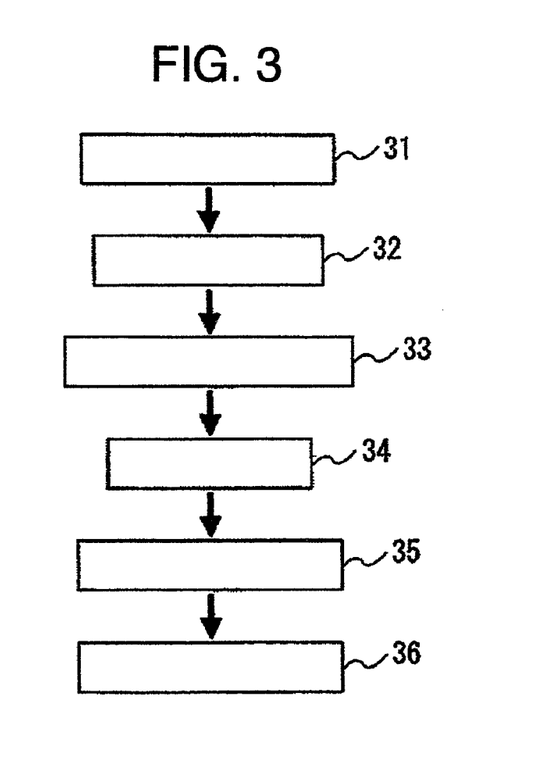
FIG. 3 is a view showing a process flow in an obstacle avoidance processor for achieving an obstacle avoidance function according to the first embodiment.

The obstacle avoidance processor 23 acquires external information by external information acquiring means 31, detects an obstacle by obstacle detecting means 32 on the basis of the acquired external information, estimates the feature of the detected obstacle by obstacle feature estimating means 33, predicts if the moving device collides with the obstacle by collision predicting means 34 on the basis of the estimated obstacle feature, plans an avoidance route by avoidance route planning means 35 in a case where the moving device collides with the obstacle, and generates a smooth avoidance path by avoidance path generating means 36 on the basis of the plan as shown in FIG. 3. In the following, each means 31 to 36 will be specifically described.

First, the external information acquiring means 31 shown in FIG. 3 acquires external information such as the size and shape of a surrounding object and a distance to the object, and time information when the external information is acquired. Accordingly, the external information acquiring means 31 is composed of the external sensor 12 capable of detecting the position and shape of an object which exists outside, and the control device thereof.

A laser range finder (referred to as LRF below), an image sensor, an optical sensor, an ultrasonic sensor, a millimeter-wave radar, or a combination thereof can be used as the external sensor 12. Since avoidance motion needs to be started in real time as described above, it is necessary to keep a sensor processing time short. For example, the LRF is a sensor which scans a laser beam such as infrared radiation at a predetermined angular interval (for example, an interval of 0.5 degrees) with a given point as the center, and measures a distance to an object in each point. Distance data d to an object measured at a predetermined angle $\theta$ can be obtained as in a point sequence shown in FIG. 4A. With current technology, the distance data to an object existing in a surrounding area can be obtained for the order of about 10 ms by using the LRF.

The obstacle detecting means 32 shown in FIG. 3 detects an object existing in a surrounding area by using the external information acquired by the external information acquiring means 31, and determines whether the object is an obstacle. The process of the obstacle detecting means 32 will be simply described using FIGS. 4A to 4C.

Figure 4A:
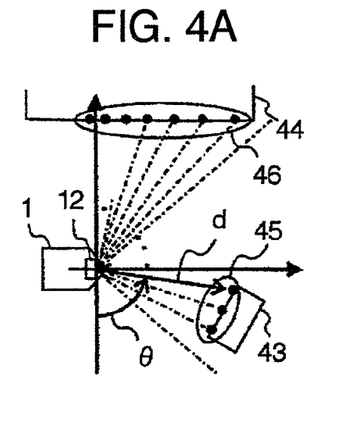
FIG. 4A is a view for explaining a process of obstacle detecting means according to the first embodiment.

First, in order to detect an object 43 or a wall 44 from the point data sequence in FIG. 4A, the obstacle detecting means 32 detects a rapid change point of the distance value d for example, and divides successive points into clusters 45 and 46, respectively. FIG. 4A is a view of a laser scanning surface of the LRF 12 that is the external sensor mounted on the moving device 41 as viewed from the top, and the measured scan data is plotted on a two-dimensional coordinate system therein.

Figure 4B:
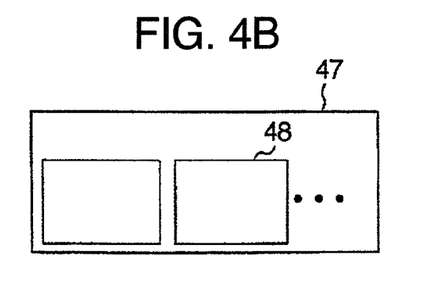
FIG. 4B is a view for explaining an initial segment list by the obstacle detecting means in FIG. 4A.

Subsequently, the obstacle detecting means 32 calculates segment information such as the representative position (gravity center or the like), size, and shape of each segment 45 and 46, and creates an initial segment list 47 shown in FIG. 4B. Links to the original scan data, such as a scan data number, are also described in the initial segment list 47. The initial segment list 47 is created each time when a scan is performed.

Then, on the basis of the time information at the time when the external information is acquired, the obstacle detecting means 32 obtains self information at the time from the operation integrated management unit 20. Here, the self information means position, direction, speed, acceleration, and self angular velocity, self posture including the arms, the region where a grasped or accompanying object exists, or the like, in a coordinate system (absolute coordinate system) on the basis of a predetermined position in an environment.

Subsequently, the obstacle detecting means 32 determines which segment recognized in a previous scan or a scan before the previous scan is applicable to an object that is currently recognized, on the basis of the information of the positional relationship in the absolute coordinate system, size, shape or the like, by using the data of the initial segment list 47 and the self information, and then associates the object with the segment, and descries the result in a current segment list 48.

Figure 4C:
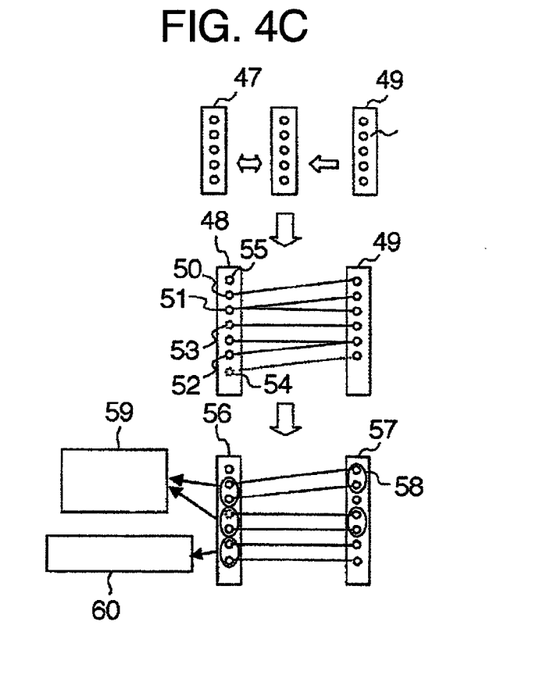
FIG. 4C is a view for explaining a process flow of the obstacle detecting means according to the first embodiment.

As shown in FIG. 4C, the obstacle detecting means 32 predicts a motion velocity vector of each segment of a previous segment list 49 from past segment lists, and calculates a predicted position of each segment at the time when the external information is acquired by using the motion velocity vector.

Subsequently, the obstacle detecting means 32 searches a segment close to the predicted position from the initial segment list 47. Furthermore, the obstacle detecting means 32 compares the sizes and shapes. In a case where the segment has not changed greatly, association information with the past segment is added, and the segment is described in the current segment list 48 as a normal segment 50. In a case where the segment has changed greatly, fusion or separation has possibly occurred. Thus, the obstacle detecting means 32 searches whether segments in the vicinity thereof are applicable. The segment is described in the current segment list 48 as a fusion segment 51 in a case where the fusion has occurred, and as a separation segment 52 in a case where the separation has occurred. Also, there is such a case that a segment is hidden behind an object in front thereof and is not recognized (occlusion). In a case where the predicted position is behind a segment and a segment which previously existed becomes smaller (including separation) or disappears, segment information in which the predicted position is set to a latest position is described in the current segment list 48 as an occlusion segment 53. Also, in a case where a segment which previously existed but does not currently exist is considered as the occlusion and there is no corresponding segment when fusion is searched, segment information in which the predicted position is set to a latest position is described in the current segment list 48 as a disappearance segment 54. When no applicable segment is found within a predetermined time, the disappearance segment 54 is eliminated from the list. Moreover, as for a new segment which did not previously exist, segment information in which the segment is set to a new segment 55 is described in the current segment list 48 in a case where there is no corresponding segment when separation is searched. As described above, the detected segments are linked to the previous segments and motion tracking thereof is always performed.

Then, the obstacle detecting means 32 determines the same object if segments have similar positions and average velocity vectors to each other, and creates a detected object list 56 in which object information 58 such as the association and an object position is described. The association is performed in view of a point that the same object is separately detected such as the legs of a human. The association with past data is also described in the current detected object list 56 by referencing a past detected object list 57. Furthermore, the object position is calculated from the information. In the above processes, the association is easily performed when a time interval between the external information is shorter since there is a smaller state change.

Subsequently, the obstacle detecting means 32 performs a process of detecting an obstacle. Here, a process of determining a known object from the detected objects is performed, and an obstacle candidate list 59 and a non-obstacle list 60 are created. The known object includes the moving device itself such as the arms, the accompanying object such as belongings, or a device, floor, ceiling, wall, and column whose motion is known and with which there is no possibility of collision. Here, as for objects associated with those in the past list, the information is used, and as for other objects, the existence region of a known object is calculated from the self information from the operation integrated management unit 20 and map data, so as to determine the detected object as a known object in a case where the detected object exists within the region. The obstacle candidate list 59 includes a known stationary obstacle such as a wall and column, an unknown stationary obstacle, a known moving obstacle, and an unknown moving obstacle.

As described above, the obstacle detecting means 32 tracks the segments and objects from the past record and determines whether the detected object composed of a single or a plurality of segments is an object to impede the motion of the moving device 1.

Figure 5:
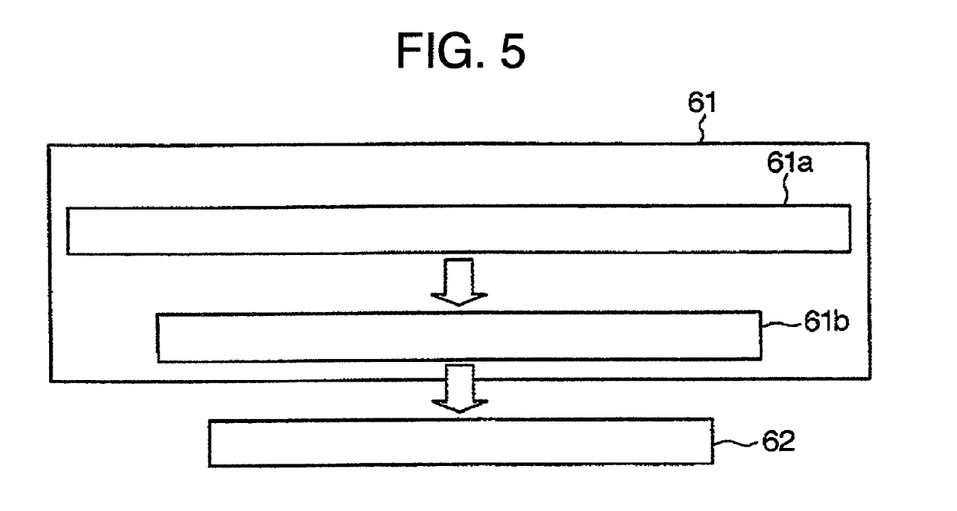
FIG. 5 is a view for explaining a process of obstacle feature estimating means according to the first embodiment.

The obstacle feature estimating means 33 shown in FIG. 3 performs a process of recognizing the feature of an obstacle, such as a process 61 of estimating an existence region and a process 62 of estimating a motion pattern of an obstacle described in the obstacle candidate list 59 as shown in FIG. 5. Here, the time-series information of the obstacle, such as the shape, size and motion quantity (vector), is used by referencing the past data of the object described in the obstacle candidate list 59.

In a first step 61a of the process 61 of estimating an existence region, the obstacle feature estimating means 33 tracks the position or feature point of each segment of the obstacle composed of a plurality of segments, and performs a contour estimation process by interpolating a portion which is not currently recognized but was recognized before due to rotation, occlusion or the like, so as to calculate the maximum contour. For example, in a case where the occlusion occurs in one of the legs of a human, the size or position of the obstacle that is a human is calculated from the segment of only one leg which is recognized, and thus the size or position differs greatly from the real size or position if the information of only the segment which is currently recognized is used. Thus, in order to correct such occlusion or the like, the contour prediction process is performed, so as to accurately calculate the size or position of the obstacle. On the other hand, as for a fast contour change which cannot be predicted from the past information, a changed portion or segment thereof is divided as another moving object. In the process 61 of estimating an existence region, in order to acquire more accurate information, the external information of a scan performed at a different height from that of a target object may be used, or the contour estimation result of the outer shape obtained by using an image sensor may be used in combination.

Subsequently, as a second step 61b of the process 61 of estimating an existence region, the obstacle feature estimating means 33 determines an obstacle virtual existence region of a simple graphic, such as a circle, polygon, and assembly of straight lines, which includes the contour of the single or plurality of segments, approximating the detected object, and determines the center position (representative position)

thereof. This process is performed for reducing the amount of calculation for a following obstacle avoidance process. In the process 62 of estimating a motion pattern, the obstacle feature estimating means 33 predicts a future motion vector from a past change in motion vector by statistical treatment by using the center position (representative position). The predicted motion vector is composed of a main component of the motion vector, a vector change component, an error component and the like as a probability distribution. Especially when the vector has not changed greatly, the motion of the detected object is approximated to linear motion and its error. Here, for the purpose of reducing the amount of calculation in the following obstacle avoidance process, the motion is approximated to the linear motion within a short time.

Figure 6A:
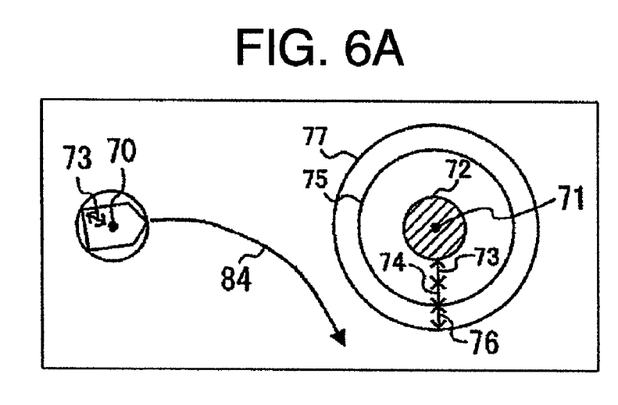
FIG. 6A is a view for explaining collision prediction according to the first embodiment, and is a view showing current positions of a self and an obstacle.

The collision predicting means 34 shown in FIG. 3 predicts a collision risk between the obstacle and the moving device itself (self) as shown in FIGS. 6A to 6D by using the feature information of the obstacle and the self information. Here, the collision predicting means 34 determines a region which the self does not enter in order to safely avoid collision with the obstacle, and examines whether there is interference with the region. FIGS. 6A to 6D are views for explaining collision prediction, and a description will be made using FIGS. 6A to 6D below. FIG. 6A shows current positions of a self 70 and an obstacle 71. For the simplicity of description, a virtual existence region 72 is shown as a circle in the drawing.

First, a region obtained by adding a maximum distance 73 from the center of a self existence region according to the self posture or accompanying object, a space 74 to be kept when the moving device and the obstacle pass each other, or the like to the obstacle virtual existence region 72 is set to be a high-risk collision region 75. For example, the error component of the motion vector calculated by the obstacle feature estimating means 33 is added as the passing space 74. When the self position enters the region, it is considered that there is a high possibility of collision. However, since the self existence region is added to the high-risk collision region 75, the self is considered as a dimensionless point 70 in the following.

Figure 6B:
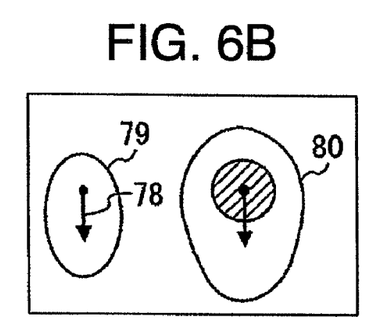
FIG. 6B is a view showing a medium-risk collision region by taking into account an elliptic region with a traveling direction being a long axis.
Figure 6C:
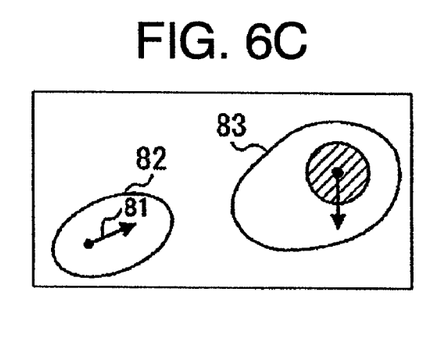
FIG. 6C is a view showing a medium-risk collision region by taking into account an elliptic region with a traveling direction being a long axis as a personal space of a self.

Subsequently, in order to adjust the avoidance start timing or improve the safety of avoidance motion, a safe distance 76 is taken into account. A region taking into account the safe distance 76 is set to be a medium-risk collision region 77. A margin region in accordance with a motion speed, or a region called personal space of a pedestrian in which a human does not feel insecure is taken into account as the safe distance 76. In FIG. 6A, the safe distance 76 has a constant distance regardless of a traveling direction. Also, a medium-risk collision region 80 shown in FIG. 6B is obtained by taking into account of an elliptic region 79 having a longitudinal axis in a traveling direction 78, as the personal space of the obstacle. A medium-risk collision region 83 shown in FIG. 6C is obtained by taking into account of an elliptic region 82 having a longitudinal axis in a traveling direction 81, as the personal space of the self. By taking into account of the region where the self does not enter as described above, avoidance can be achieved without making a pedestrian feel insecure. The collision region is set with respect to an obstacle. Also, a plurality of medium-risk collision regions may be prepared and selectively used depending on a situation such as urgency.

Then, the collision predicting means 34 performs collision prediction by examining interference between the region and the self. Here, the collision prediction is performed by examining whether a relative motion track 84 obtained by moving the self point 70 with a relative motion vector between the self and the obstacle interferes with the medium-risk collision region 77 or the high-risk collision region 75. When there is interference, a collision flag is set. Here, the collision flag is determined by multiple stages depending on the urgency or risk. For example, the flag is set to be a high-risk collision flag if a time to collision is less than 2 seconds, to a medium-risk collision flag if a time to collision is 2 seconds or more to less than 5 seconds, and to a low-risk collision flag if a time to collision is 5 seconds or more.

The examination is calculated with respect to all the obstacles. Here, since the calculation assumes a space in which the obstacle position is fixed and the self moves with the relative vector, the space is called an obstacle position-fixing relative space.

In particular, a case in which both an obstacle 85 and a self 86 move uniformly and linearly in the collision examination will be described using FIG. 6D. In this case, a case in which the direction of a relative motion vector 87 exists between boundary directions 88 and 89 of a high-risk collision region is determined as collision. Here, a collision determination expression is shown in a next expression (1) wherein a position vector 90 from the self to the obstacle is $\vec{P}$, a unit component 91 of the relative motion vector is $\vec{Ve}$, a unit vector 92 in the tangential direction is $\vec{Ce}$, a distance 93 from a contact point between the medium-risk collision region and the boundary direction to the obstacle center position is Rd, and a distance from the position of the self 86 to a contact point 94 with the high-risk collision region is Ld.

Figure 6D:
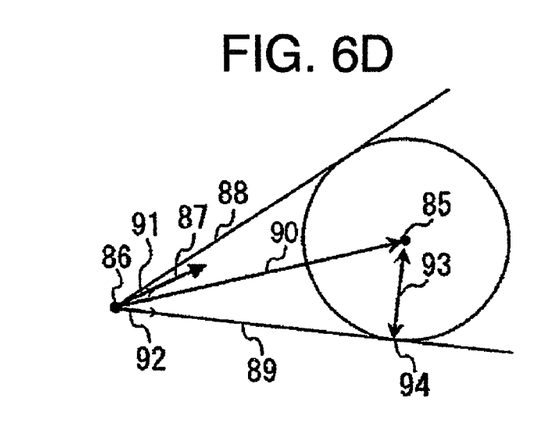
FIG. 6D is a view for explaining a collision examination in a case where both an obstacle and a self move uniformly and linearly.

[Expression 1]

$$\vec{Ve} \cdot \vec{P} > \vec{Ce} \cdot \vec{P} = \sqrt{|\vec{P}|^2 - Rd^2} \qquad (1)$$

$$\text{where } \vec{Ce} = \frac{1}{|\vec{P}|^2}\begin{pmatrix} Px \times Ld + Py \times Rd \\ Py \times Ld - Px \times Rd \end{pmatrix} \text{ in FIG. 6D}$$

$\vec{P}$: obstacle position vector where $\vec{P} = (Px \quad Py)$ $\vec{Ve}$: relative motion unit vector $\vec{Ce}$: tangential unit vector When the collision determination expression is satisfied, the time to collision is calculated, and the collision flag is set. As described above, by approximating the motion patterns of the obstacle 85 and the self 86 to uniform linear motion, and performing the collision prediction process in the obstacle position-fixing relative space, very fast calculation is enabled. Accordingly, it is preferable to reduce computation load by approximating the motion vectors of the obstacle 85 and the self 86 to simple motion models such as the uniform linear motion to the extent possible, and performing the collision calculations by adding the error as the safe distance of the high-risk collision region. In particular, by making a plan on the basis of the uniform linear motion to the extent possible with respect to the motion of the self 86, the computation time can be reduced, and the prediction is easier to perform. In the following description, the motion vector of the obstacle or the self is described as the uniform linear motion.

The avoidance route planning means 35 shown in FIG. 3 plans an avoidance route for avoiding the obstacle when the collision flag is set. The avoidance route does not mean an accurate path on which the moving device actually travels, but a rough route which defines to pass through a predetermined through point such as the right or left of the obstacle, or an avoidance region.

Here, the avoidance route planning means 35 checks the collision flag to examine the urgency of collision first, and makes a route plan of corresponding avoidance motion. For example, when the type of the collision flag is the high-risk collision flag, it is necessary to immediately start the avoidance motion. The avoidance motion to be selected includes changing of a self motion direction to pass through the left or right of the medium-risk collision region, changing of a self motion direction to pass through the left or right of the high-risk collision region, speed reduction so as not to enter the high-risk collision region, and stoppage after moving so as not to enter the high-risk collision region depending, on the urgency. In a case where a plurality of medium-risk collision regions are prepared, it is necessary to select one of them in accordance with the type of the collision flag. For example, in the case of the low-risk collision flag, the largest medium-risk collision region is used. In such a manner, sufficiently safe avoidance can be achieved.

In the following, a method of obtaining a through point of the avoidance route will be simply described using FIGS. 7A to 7D.

Figure 7A:
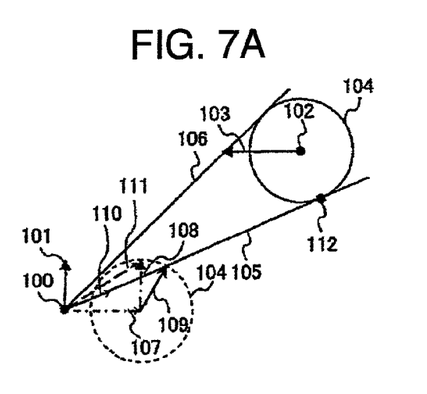
FIG. 7A is a view for explaining a method of obtaining a through point according to the first embodiment, and is a view showing an example of a method of changing a self motion vector for avoiding an obstacle.

First, FIG. 7A shows an example of a method of changing a self motion vector for avoiding the obstacle. FIG. 7A shows the obstacle position-fixing relative space at a given time in a case where there is a single obstacle. A self 100 moves with a unit time motion vector 101, and an obstacle 102 moves with a unit time motion vector 103. Accordingly, a unit time relative motion vector 111 is the resultant vector composed of a vector 108 which is obtained by moving the unit time motion vector 101 of the self 100 in parallel, and a vector S→107 which is obtained by moving in parallel and reversing the direction of the unit time motion vector 103 of the obstacle 102. In order to avoid the obstacle 102, the top end of the unit time relative motion vector 111 may be changed to be outside of tangent lines 105 and 106 of the self 100 and a medium-risk collision region 104 of the obstacle 102. For example, in a case where the self 100 maintains its motion speed and avoids the obstacle 102 only by a change in direction, the motion vector 108 of the self is changed to a vector V→109. Here, when a unit vector in a direction to contact the tangential direction 105 is C→110, the changed unit time motion vector V→109 of the self is represented by a next expression (2).

[Expression 2]

$$\vec{V} = k\vec{C} - \vec{S} \text{ where } k = \vec{C} \cdot \vec{S} + \sqrt{|V|^2 + |\vec{C} \cdot \vec{S}|^2 - |\vec{S}|^2} \quad (2)$$

Figure 7B:
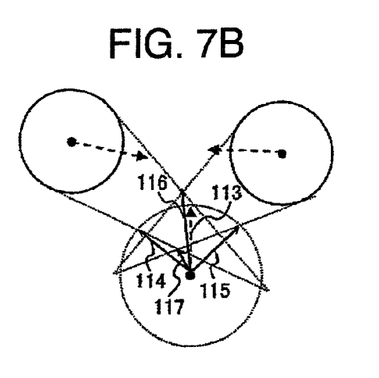
FIG. 7B is a view showing an example of avoiding two obstacles at the same time in a case where a time to collision with the two obstacles draws near.

FIG. 7B shows an example of avoiding two obstacles at the same time by assuming a case in which the time to collision with the two obstacles draws near. In this case, the avoidance route planning means 35 determines an avoidance vector in a similar manner to the case where there is a single obstacle. FIG. 7B shows avoidance vectors 114 and 115 which maintain a motion speed, an avoidance vector 116 which avoids the obstacles by accelerating the speed, and an avoidance vector 117 which avoids the obstacles by decelerating the speed. The one easily changed from an original self unit motion vector 113 is selected therefrom. The self avoidance motion vector is determined by using the obstacle position-fixing relative space as described above.

Figure 7C:
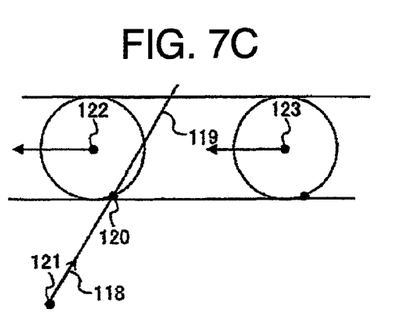
FIG. 7C is a view showing a positional relationship in an absolute space among a current self position, a current obstacle position, a self position at the time of closest approach, and an obstacle position at the time of closest approach.

Next, the avoidance route planning means 35 obtains a through line and a through point in an absolute space. FIG. 7C shows the positional relationship in the absolute space among a current self position 121, a current obstacle position 123, a self position 120 at the time of closest approach, and an obstacle position 122 at the time of closest approach. Here, the avoidance route planning means 35 obtains a time to reach a closest point (for example, a point 112 in FIG. 7A) to the obstacle in the relative space. On the basis of an avoidance motion vector 118 in the absolute space at that time, an avoidance line 119 and a closest point 120 in the absolute space are obtained as shown in FIG. 7C. Here, the closest point 120 is set to the through point. However, the through point depends on a subsequent path, and is finally determined at the time of generating a path.

When it is necessary to avoid a next obstacle after this, the above processes are repeatedly performed with the through point set as a starting point. As described above, in a case where a plurality of obstacles are scattered in a moving environment, it is necessary to limit the obstacles to be taken into account, and determine the order of avoiding the obstacles.

The limitation of the obstacles to be taken into account is determined on the basis of a distance between the self and the obstacle, a time until the self and the obstacle approach each other, or the like. For example, the self avoidance motion vector for allowing the relative motion vector to contact the boundary line of the high-risk collision region, and the time to collision when the self maintains the current speed in the relative position space are calculated with respect to all the obstacles, and an obstacle whose time to collision is 10 or 5 seconds or less is considered as the obstacle with a possibility of collision.

Figure 7D:
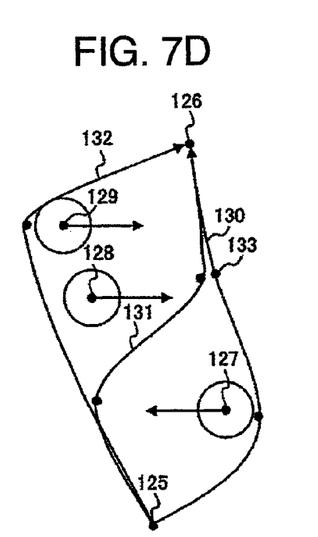
FIG. 7D is a view showing combinations of avoidance orders in a case where obstacles exist between a starting point and a target point.

Subsequently, the avoidance route planning means 35 determines the order of avoiding the obstacles, and calculates the through point and the avoidance route in the order. The order is determined by searching all the possibilities with respect to the obstacles with a possibility of collision, or by searching the obstacle having a shortest time to collision with priority and the search may terminated when an appropriate avoidance route is found. For example, in a case where obstacles 127, 128 ad 129 exist between a starting point 125 and a target point 126 of the moving device as shown in FIG. 7D, there are two through points in the right and left with respect to each obstacle, and thus, there are 192 combinations of avoidance orders. However, when the through point exists in the high-risk region of another obstacle, or when the moving device can reach the target point directly from the through point, a subsequent combination is not searched. For example, the avoidance order of an avoidance route 130 is the right of the obstacle 127, the right of the obstacle 128, and the target point. Similarly, an avoidance route 131 is in the order of the left of the obstacle 127, the right of the obstacle 128, and the target point. An avoidance route 132 is in the order of the left of the obstacle 129, and the target point. Since the moving device can reach the target point directly from a through point 133, routes which pass through the through points in the right and left of the obstacle 129 are not searched.

Although the moving obstacles are shown here, stationary obstacles are similarly processed. Also, the avoidance route may be connected to a target direction instead of the target point. The operation integrated management unit 20 sets the target point or target direction. In the aforementioned manner, a plurality of avoidable route candidates are calculated.

As described above, a plurality of routes which pass through one of the right and left, and surrounding points as the through point for avoiding the obstacle are generated. Subsequently, theses routes are ranked in accordance with some evaluation items such as a shortest distance, a smallest angular change, a smallest speed change, a shortest arrival time, passing behind a moving obstacle, or a route width.

Figure 8:
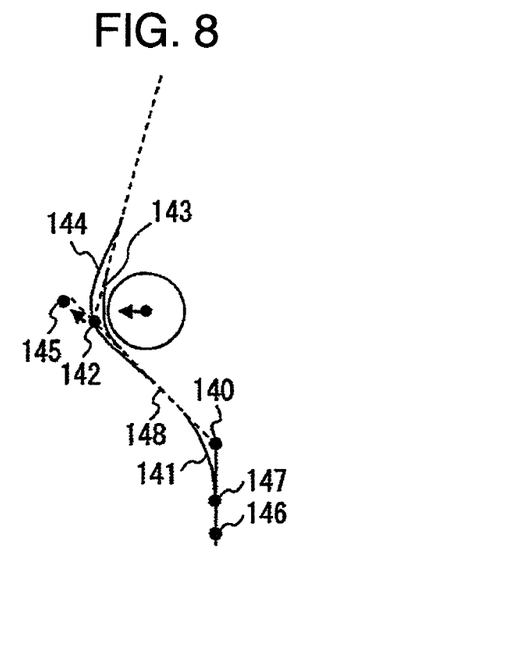
FIG. 8 is a view for simply explaining generation of an avoidance path according to the first embodiment.

The avoidance path generating means 36 shown in FIG. 3 generates a smooth avoidance path which passes through the vicinity of each through point of the selected avoidance route and on which the moving device can travel. FIG. 8 is a view for explaining the generation of the avoidance path according to the present embodiment. Here, a smooth curve line 141 passing through a through point 140 or the vicinity thereof, and a curve line 144 passing through a through point 142 or a smooth curve line 143 passing through the vicinity of the through point 142 are generated. Since the avoidance route is successively updated, the avoidance path is generated with respect to a route of following few seconds, for example. Although a function generation method of a curve line is not limited in the present invention, the curve line may be generated by a generally known spline function, Bezier function, high-dimensional function using the constraint of each point, the constraint of a curvature change and the like, or in accordance with a control model of the moving device.

The generated curve line is examined whether it interferes with the medium-risk collision region or high-risk collision region in a real space. The collision calculations are performed in the relative space. Some interference with the medium-risk collision region does not become a problem since the sufficiently large safe region is ensured. However, in a case where the curve line interferes with the high-risk collision region, the avoidance path generating means 36 generates a curve line again by moving the through point and using a new through point 145. At the same time, in order to confirm whether the moving device can actually travel on the curve line, the avoidance path generating means 36 examines if conditions of curvature restrictions, restrictions on curvature change, speed restrictions or the like are satisfied on the basis of the model of the moving device. When the through point is moved, avoidance paths using through points slightly displaced in surrounding eight directions may be evaluated and a through point by which the curvature change is smooth and smallest may be selected. In order to reduce the amount of calculation, the examination of restrictions is mainly performed in the vicinity of a through point. In a case where the curve line does not converge after repeating these processes in a plurality of times, the avoidance path generating means 36 selects another route out of the plurality of routes and generates a path again. The generated path is transmitted to the travel control unit 22 via the operation integrated management unit 20. The travel control unit 22 performs control for allowing the moving device to actually follow the path.

Also, in order to avoid such a situation that it is difficult for the moving device to follow the planned path due to the presence of a free running period when the avoidance path is planned from a current position, the next avoidance plan is made from a position 140 after passage of a predetermined time relative to a current position 146 in FIG. 8. At this time, the path generating means generates a smooth curve line connecting from a position 147 after a predetermined free running period to a new avoidance route 148. By using the method, a curve line which smoothly connects from a current travel path to a new avoidance path can be easily generated. By generating a smooth path on the basis of the through point as described above, the moving device can stably and reliably travel on the planned path even during high-speed motion.

Furthermore, the operation integrated management unit 20 shown in FIG. 2 performs avoidance execution control, and switches a prescribed path to an avoidance path when the collision flag and the avoidance path are set. The operation integrated management unit 20 monitors the execution status of avoidance motion, and switches to a path to a next destination when the avoidance is completed. Also, the operation integrated management unit 20 changes the self state to a safe posture in order to avoid collision with the obstacle during the avoidance.

As described above, according to the present embodiment, the collision prediction with an obstacle moving at a high speed, the avoidance route calculations, and the generation of an achievable avoidance path are enabled in real time in the moving device 1. Also, a smooth avoidance path can be obtained. Therefore, the moving device 1 can avoid a fast moving obstacle, and move at a high speed even under an environment where the fast moving obstacle exists.

Second Embodiment

Figure 9:
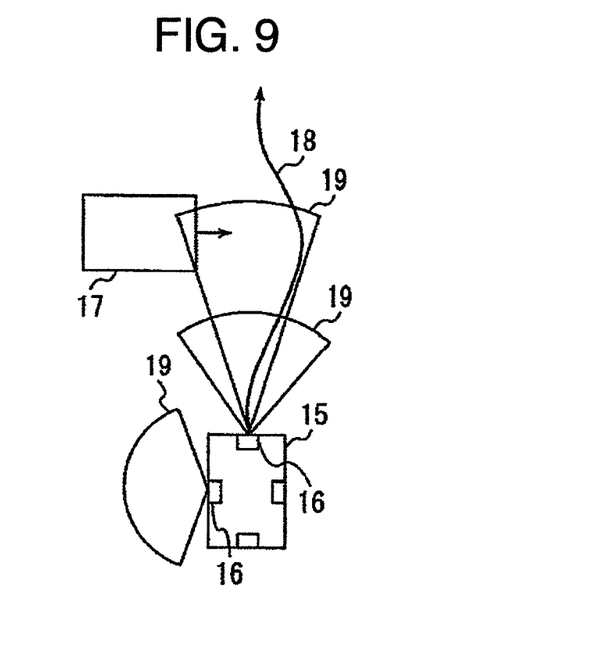
FIG. 9 is a view for explaining a moving device according to a second embodiment of the present invention.

Next, a second embodiment of the present invention will be described using FIG. 9. FIG. 9 is an explanatory view of a moving device 15 according to the second embodiment of the present invention. The second embodiment differs from the first embodiment in a respect which will be described next, and is basically the same as the first embodiment in other respects. Thus, an overlapping description will be omitted. In the second embodiment, a configuration common to the first embodiment produces the same effects.

The moving device 15 in the second embodiment is an example of an automobile which includes an external sensor 16 having a sensing region 19 for detecting an obstacle 17, and performs avoidance motion for safely avoiding the detected obstacle 17. The avoidance motion here includes not only automatic avoidance but presentation or instruction of an avoidance route, steering angle, speed or the like by an image or sound, and a drive assist such as direct or indirect control of a steering device or travel control device. Here, the "indirect control" means to lead a driver to safely drive the moving device by performing load control of the steering device, for example.

Since the moving device 15 in the second embodiment also moves at a high speed under an environment where a moving obstacle exists in a similar manner to the moving device 1, it is necessary to perform the process of calculating, at a high speed, the avoidance motion for avoiding collision with the obstacle 17, and calculate a smooth avoidance path 18. In particular, since the automobile can travel at a speed of about 30 m/s, a rapid direction change is dangerous, and the issue of calculating a smooth travel path is very important. Also, since the speed is high010, a range per unit time which the automobile can travel is wide, so that the external sensor 16 needs to detect a wider range (sensing region) 19 than that of the external sensor 12, and at the same time, the avoidance process calculations need to be performed with respect to a wide range of environment. Thus, reduction in computation time is also an important issue.

The second embodiment has been made to solve such issues, and the moving device 15 of the second embodiment is also included in the applications of the present invention in a similar manner to the case of the moving device 1. Therefore, a driver is allowed to highly safely drive the moving device.

Accordingly, the present invention can be used in the moving device having the above issues. In addition to such moving device, a device analogized to a simulator which performs pseudo motion that is not accompanied by real motion is also included in the applications of the present invention.

Although the above description is made with respect to the embodiments, the present invention is not limited thereto, and it is obvious to those skilled in the art that various changes and modifications may be made therein within the spirit of the invention and the scope of appended claims.

The invention claimed is:

1. A moving device that moves under an environment where a moving obstacle exists, comprising:
   external information acquiring means for acquiring external information;
   obstacle detecting means for detecting an external object in an absolute coordinate system from time-series information in which the external information acquired from the external information acquiring means and self information of the moving device are accumulated, and for extracting an obstacle that is an object possibly impeding the motion of the moving device from the time-series information;
   obstacle feature estimating means for estimating a feature of the obstacle, including a size, a shape or a shape change of the obstacle and a position and a motion pattern of the obstacle from the time-series information of the plurality of obstacles detected by the obstacle detecting means;
   collision predicting means for predicting possibility of collision with the obstacle from the feature of the obstacle and the self information and path information of the moving device;
   avoidance route planning means for calculating, in a case where collision with the obstacle is predicted, a through point that passes through right or left side or a surrounding area of the obstacle for avoiding the obstacle, and in a case where the possibility of collision is still predicted after passing the through point, further calculating a through point that passes through right or left side or a surrounding area of the obstacle for avoiding the obstacle, whereby planning a single or a plurality of avoidance routes that pass through one or more through points; and
   avoidance path generating means for adjusting the through point so as not to interfere with the obstacle, and generating a smooth avoidance path on which the moving device can travel.

2. The moving device according to claim 1,
   wherein the collision prediction with the obstacle by the collision predicting means, or the calculation of changes in a motion direction and a motion speed of the moving device itself by the avoidance route planning means, or the calculation of the through point by the avoidance route planning means is calculated by using an obstacle-fixing-relative-space in which the position of the obstacle is fixed and the moving device moves with a relative motion vector with the obstacle, and
   wherein the generation of the avoidance path by the avoidance path generating means is calculated from a through point information and time information in the obstacle-fixing-relative-space, with use of the through point in the absolute coordinate system having an origin of the coordinate corresponding to a point in a real space.

3. The moving device according to claim 1,
   wherein the obstacle feature estimating means comprises at least one of:
   means for approximating the shape of the obstacle to a simple graphic including a circle, or a polygon, or a single or a plurality of straight lines;
   means for approximating the motion pattern of the obstacle to uniform linear motion, and
   means for approximating a motion pattern of the moving device to uniform linear motion.

4. The moving device according to claim 1,
   wherein the collision predicting means prepares, as a region where the moving device does not enter, a region that has a risk to collide with the obstacle and a region that takes into account of a safe distance between the obstacle and the moving device, and uses the regions for collision prediction to adjust timing of starting of avoidance.

5. The moving device according to claim 1,
   wherein the avoidance route planning means smoothly connects a current path to the avoidance path by making a new avoidance plan from a position on the current path and before a starting point of a new avoidance pass along which actual avoidance action can be started.

6. The moving device according to claim 1,
   wherein the avoidance route planning means sets an order of priority by evaluating at least one of a shortest route, a shortest arrival time, a smallest angular change, a smallest speed change, passing behind a moving obstacle, and a width of an avoidance route when it finally selects an avoidance route from the plurality of avoidance routes, wherein the avoidance path generating means generates an avoidance path from the avoidance route in order from the high priority, and the avoidance route planning means evaluates whether the moving device can move smooth and without interacted by the obstacle.

7. The moving device according to claim 1, wherein the obstacle feature estimating means performs an obstacle avoidance process by regarding a portion that changes greatly as an independent moving obstacle in a case where the obstacle changes greatly in shape.

8. A moving device that moves under an environment where a stationary or moving obstacle exists, comprising:
   external information acquiring means for acquiring external information;
   obstacle detecting means for detecting an external object from time-series information in which the external information acquired from the external information acquiring means and posture information of the moving device are accumulated, and for extracting an obstacle that is an object possibly impeding the motion of the moving device from the time-series information;
   obstacle feature estimating means for estimating a feature of the obstacle, including a size, a shape or a shape change of the obstacle and a position and a motion pattern of the obstacle from the time-series information of the single or the plurality of obstacles detected by the obstacle detecting means;
   collision predicting means for predicting collision with the obstacle from the position and feature of the obstacle and the posture information and path information of the moving device;
   avoidance route planning means for calculating a through point that passes through right or left side or a surrounding area of the obstacle for avoiding the obstacle, and planning a single or a plurality of avoidance routes that pass through the through point in a case where collision with the obstacle is predicted; and
   avoidance path generating means for adjusting the through point so as not to interfere with the obstacle, and generating a smooth avoidance path on which the moving device can travel,
   wherein the avoidance path generating means performs a search such that the smooth avoidance path becomes smoothest while moving a through point, by repeatedly evaluating an avoidance path obtained by displacing the through point in surrounding eight directions and selecting the through point through which a curvature change is smooth and smallest.

9. A moving device that moves under an environment where a stationary or moving obstacle exists, comprising:
   external information acquiring means for acquiring external information;
   obstacle detecting means for detecting an external object from time-series information in which the external information acquired from the external information acquiring means and posture information of the moving device are accumulated, and for extracting an obstacle that is an object possibly impeding the motion of the moving device from the time-series information;
   obstacle feature estimating means for estimating a feature of the obstacle, including a size, a shape or a shape change of the obstacle and a position and a motion pattern of the obstacle from the time-series information of the single or the plurality of obstacles detected by the obstacle detecting means;
   collision predicting means for predicting collision with the obstacle from the position and feature of the obstacle and the posture information and path information of the moving device;
   avoidance route planning means for calculating a through point that passes through right or left side or a surrounding area of the obstacle for avoiding the obstacle, and planning a single or a plurality of avoidance routes that pass through the through point in a case where collision with the obstacle is predicted; and
   avoidance path generating means for adjusting the through point so as not to interfere with the obstacle, and generating a smooth avoidance path on which the moving device can travel,
   wherein the moving device further comprising an operation integrated management unit for changing a posture of the moving device to reduce interference with the obstacle during avoidance.

10. The moving device according to claim 1, wherein the avoidance route planning means connects a last through point for avoiding the obstacle to a straight line in a motion target direction or a target point of the moving device.

11. A moving device that moves under an environment where a stationary or moving obstacle exists, comprising:
    external information acquiring means for acquiring external information;
    obstacle detecting means for detecting an external object from time-series information in which the external information acquired from the external information acquiring means and posture information of the moving device are accumulated, and for extracting an obstacle that is an object possibly impeding the motion of the moving device from the time-series information;
    obstacle feature estimating means for estimating a feature of the obstacle, including a size, a shape or a shape change of the obstacle and a position and a motion pattern of the obstacle from the time-series information of the single or the plurality of obstacles detected by the obstacle detecting means;
    collision predicting means for predicting collision with the obstacle from the position and feature of the obstacle and the posture information and path information of the moving device;
    avoidance route planning means for calculating a through point that passes through right or left side or a surrounding area of the obstacle for avoiding the obstacle, and planning a single or a plurality of avoidance routes that pass through the through point in a case where collision with the obstacle is predicted; and
    avoidance path generating means for adiustinq the through point so as not to interfere with the obstacle, and generating a smooth avoidance path on which the moving device can travel,
    wherein the obstacle detecting means composes the time-series information of a time when the external information is acquired, a position, a size and a shape of an object detected from the external information, a self position, a self direction and a self posture of the moving device at the time, and association information of data of the detected object at a different time.

12. The moving device according to any one of claims 1 to 11, further comprising at least one of:
    means for presenting or instructing an operation information of the moving device including at least one of avoidance route, operation angle and speed for avoiding the possible colliding obstacle, with an image or a sound by using information of the generated smooth avoidance path;

steering means for changing operation load by using the information of the generated smooth avoidance path.

13. A method of avoiding contact with a moving obstacle while moving under an environment where the moving obstacle exists, comprising the steps of:

acquiring external information;

detecting an external object in an absolute coordinate system from time-series information in which the external information and self information of the moving device are accumulated, and extracting an obstacle that is possibly impeding the motion of the moving device from the time-series information;

estimating a feature of the obstacle including a size, a shape or a shape change of the obstacle and a position and a motion pattern of the obstacle from the time-series information the plurality of obstacles;

performing collision prediction possibility of collision with the obstacle from the feature of the obstacle and the self information and path information of the moving device;

calculating, in a case where collision with the obstacle is predicted, a through point that passes through right or left side or a surrounding area of the obstacle for avoiding the obstacle, and in a case where the possibility of collision is still predicted after passing the through point, further calculating a through point that passes through right or left side or a surrounding area of the obstacle for avoiding the obstacle, whereby planning a single or a plurality of avoidance routes that pass through one or more through points; and adjusting the through point so as not to interfere with the obstacle, and generating a smooth avoidance path on which the moving device can travel.

* * * * *